United States Patent [19]

Gradin

[11] Patent Number: 4,639,106
[45] Date of Patent: Jan. 27, 1987

[54] AIRCRAFT VIDEO PROJECTION SYSTEM

[75] Inventor: James H. Gradin, Irvine, Calif.

[73] Assignee: Sundstrand Data Control, Inc., Redmond, Wash.

[21] Appl. No.: 727,580

[22] Filed: Apr. 26, 1985

[51] Int. Cl.[4] ............................................. G03B 21/30
[52] U.S. Cl. ...................................... 353/13; 353/79; 353/72
[58] Field of Search ...................... 353/12, 13, 79, 72; 352/104, 132; 358/231, 237, 238

[56] References Cited

U.S. PATENT DOCUMENTS

| | | |
|---|---|---|
| 2,489,835 | 11/1949 | Traub .................................. 353/79 X |
| 2,509,508 | 5/1950 | Kalff et al. .......................... 353/79 X |
| 2,683,390 | 7/1954 | Steele ................................. 353/79 X |
| 3,457,006 | 7/1969 | Brown et al. ....................... 353/13 X |
| 3,944,734 | 3/1976 | Ogawa . |
| 4,074,322 | 2/1978 | Cammilleri . |
| 4,209,807 | 6/1980 | Arita . |
| 4,234,894 | 11/1980 | Tokumaru et al. . |
| 4,245,256 | 1/1981 | Kokubo . |
| 4,281,352 | 7/1981 | Hoffman . |
| 4,313,208 | 1/1982 | Kavenik . |
| 4,352,124 | 9/1982 | Kline . |
| 4,403,815 | 9/1983 | Runco . |

FOREIGN PATENT DOCUMENTS 214749 8/1941 Switzerland .......................... 353/79

*Primary Examiner*—Harry N. Haroian
*Attorney, Agent, or Firm*—Christensen, O'Connor, Johnson & Kindness

[57] ABSTRACT

Disclosed herein is a video projection system (18) suitable for mounting in the ceiling of the passenger compartment of an aircraft for displaying video images for passengers embarked on the aircraft. The video projection system includes a video projector (19) positioned to project video images through an opening in the ceiling, a light deflector (21) positioned to deflect the light from the video projector along a different path, and a projection screen (23) positioned to receive and display the deflected video images. Various embodiments are disclosed wherein the light deflector and/or projection screen are mounted for movement from stowed to deployed positions, the deflector and/or projection screen being movable in a controlled manner that does not pose a significant safety hazard.

10 Claims, 4 Drawing Figures

AIRCRAFT VIDEO PROJECTION SYSTEM

TECHNICAL FIELD

The present invention relates in general to aircraft entertainment systems for providing in-flight passenger entertainment, and in particular to aircraft video projection systems.

BACKGROUND OF THE INVENTION

Recent developments in video technology, most notably component miniaturization and enhancement of light output intensity from video projectors, coupled with the virtual explosion in the number of popular titles now available on prerecorded video cassettes, has led many, if not most, passenger airlines to incorporate new generation video projection systems as a part of their passenger entertainment systems.

Aircraft video projection systems for playing prerecorded video cassettes include a video cassette player, a video projector for transmitting the prerecorded program as a series of interrelated video images, and a projection screen for receiving and displaying the video images to the aircraft passengers. A problem presented to the airline industry by such systems stems from their need to have an uninterrupted light path between the video projector and the projection screen. Because of the rather limited floor-to-ceiling distance in most aircraft passenger cabins, the ever present obstructions such as overhead storage compartments, passenger warning lights/signs, drop ceilings and the like, and the viewing angle limitations resulting from passenger cabin seating arrangements, rather severe constraints are placed on where the video projector and projection screen may be located.

The airline industry's response to the foregoing problem has been to employ an arrangement where the video projector is suspended from the cabin ceiling and pointed towards the projection screen. This arrangement has several drawbacks, the most notable of which in the case of single aisle aircraft is the serious risk of head injury posed towards unwary passengers by a video projector suspended over the aisle. Even careful passengers are at risk when negotiating the cabin's aisle as any unexpected event, such as momentary air turbulence, may temporarily divert their attention and set the stage for potentially serious injury.

Another drawback relates to the fact that, in the past, the video projector and the projection screen have been spaced a relatively considerable distance apart. Passengers assigned to seats located between the video projector and the projection screen who move about the cabin while a program is being shown can not avoid interfering with the viewing enjoyment of the other passenger.

A still further drawback relates to the aircraft cabin environment itself. The rigors of confinement in a relatively small space, for many hours at a time, has resulted in the design of passenger cabin interiors which are intended to be aesthetically pleasing and provide a feeling of spaciousness. A video projector suspended from the ceiling does little, if anything, to promote aesthetic appeal. Furthermore, its intrusion into the cabin space serves as a constant reminder to some passengers that they are situated in a confined space, thereby defeating in large measure the intent of the particular cabin interior design.

Despite recognition within the airline industry of the need for a video projection system which overcomes the foregoing drawbacks, no such system has been forthcoming. Consequently, until the present invention the need for such a system has remained unfulfilled.

SUMMARY OF THE INVENTION

In accordance with the present invention, an aircraft video projection system is provided that includes a video projector mounted above a ceiling in the passenger cabin such that the projector is substantially hidden from view. The ceiling may comprise either the actual passenger cabin ceiling itself, or a false ceiling in the cabin such as results from overhead storage compartments and the like. The light beam produced by the video projector is transmitted through an opening in the ceiling. A mirror supported proximate the opening intersects the light beam and deflects it along a predetermined path towards a projection screen. The projection screen receives and displays the video images carried by the light beam to the aircraft passengers.

In accordance with one aspect of the invention, the mirror is preferably mounted on a movable support that permits mirror movement from a normally stowed position to a deployed position whereat the mirror intersects the light beam and deflects it towards the projection screen. Preferably, mirror movement is rotational and results from making the movable support as a hinged ceiling panel, which also serves as a door that closes the ceiling opening. When in the closed or stowed position the ceiling panel is substantially flush with the ceiling and thus presents a neat and clean appearance which blends harmoniously with its surroundings.

In accordance with another aspect of the invention, the projection screen is mounted on a movable support in the form of a hinged ceiling panel similar to the aforementioned mirror-supporting ceiling panel. The projection screen is thus rotatable from a normally stowed position to a deployed position in light receiving alignment with the mirror. In its stowed position the projection screen-supporting ceiling panel is likewise substantially flush with the ceiling to blend harmoniously therewith.

The invention preferably also includes limiting means for limiting rotational movement of the movable supports to within a range of angular travel defined at its limits by the aforementioned stowed and deployed positions. Such limiting means additionally include means for limiting the rate of such rotational movement so that the movable supports do not pose a safety hazard to persons deploying same.

BRIEF DESCRIPTION OF THE DRAWINGS

The above-mentioned and other features of this invention, and the manner in which they are attained will become apparent, and the invention itself will be best understood by reference to the following description of a preferred embodiment of the invention when taken in conjunction with the accompanying drawings, wherein.

DESCRIPTION OF THE PREFERRED EMBODIMENTS

Figure 1:
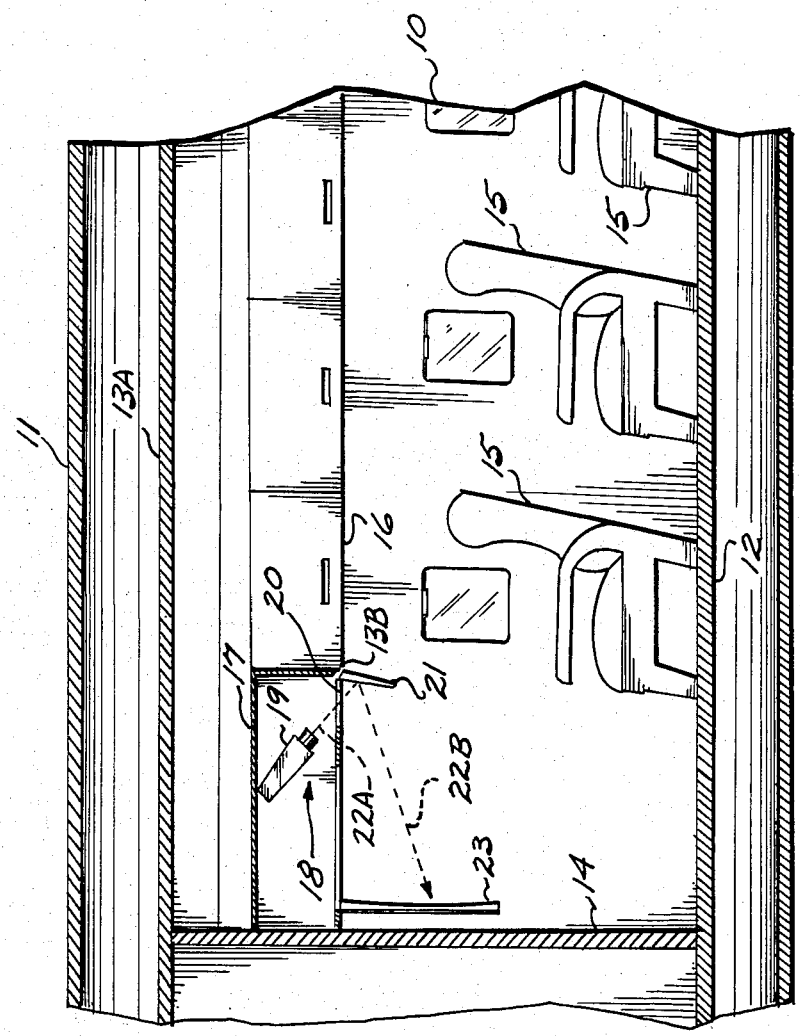
FIG. 1 is a partial, cut-away side view of a typical aircraft passenger cabin generally illustrating the manner in which the present invention will be typically employed.

Referring to FIG. 1, there is shown an aircraft passenger cabin 10 enclosed by the fuselage 11 of an aircraft. Passenger cabin 10 includes a floor 12, an upper ceiling 13A and a forward bulkhead 14. The bulkhead may comprise either a cabin divider separating one passenger section of the aircraft from another, or a pressure bulkhead. A plurality of forwardly-facing passenger seats 15 are mounted on the floor 12, and conventional storage compartments 16 are provided and mounted overhead the passenger seats 15. Storage compartments 16 extend longitudinally along the cabin 10 on each side thereof, defining a lower ceiling 13B, and are joined at the forward portion of the cabin by a compartment 17, which is sometimes referred to as either a "drop ceiling" or a "hydroplane."

An aircraft video projection system 18 formed in accordance with the preferred embodiment of this invention includes a video projector 19 supported within the interior of compartment 17 in downwardly-inclined, aft-facing alignment with the cabin 10. A light exit opening 20 is provided through the bottom of the compartment 17. A mirror assembly 21 is supported proximate the opening 20 in a position to deflect or redirect the light beam produced by the video projector 19 and travelling along a first light path 22A. The video images carried by the light beam are deflected by the mirror assembly 21 along a second light path 22B onto the image surface of a projection screen assembly 23. In this form of the invention both the mirror assembly 21 and the projection screen assembly 23 form an integral part of the compartment 17, with each of them being rotatably attached to the compartment in order that they may be moved between stowed positions whereat they form the bottom of the compartment 17 and the deployed positions illustrated in FIG. 1. The first and second light paths, 22A and 22B, define a combined light path having a length that, in part, determines the image size projected on the screen. Thus, to produce a desired image size on the projection screen, the length of either the first light path 22A or second light path 22B could normally be adjusted. For fixed systems employed in aircraft, however, the length of the second light path 22B is preferably sufficiently short to allow the entire aircraft video projection system 18 to be located forward of the foremost passenger seat 15, thereby minimizing passenger interference with the video images projected. In addition, the vertical component of the first light path 22A is limited by the available compartment 17 clearance. Therefore, it has been found desirable to support video projector 19 in a position with the first light path 22A forming an acute angle with the portion of the lower ceiling 13B defined by the bottom of the compartment 17. In that manner, the length of the combined light path is increased for a given length of second light path 22B and given vertical component of first light path 22A.

Figure 2:
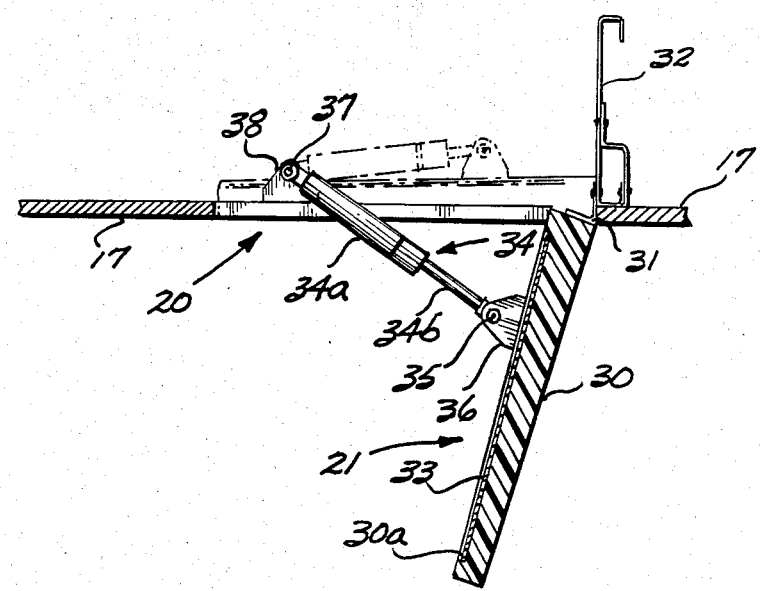
FIG. 2 is a partial, cut-away side view of the preferred form of the mirror assembly 21 shown in FIG. 1.

FIG. 2 illustrates in greater detail the mirror assembly 21 of FIG. 1. More particularly, the mirror assembly 21 comprises a substantially planar support or door 30 which is rotatably attached to the compartment 17 by a hinge 31 affixed to a ceiling support member 32. The shape and dimensions of the margins of the door 30 are complementary to the opening 20 so that when the mirror is stowed the door serves as a closure for the opening. The exterior of the door is selected to match the exterior appearance of the compartment 17. A mirror 33 is mounted on the door 30 and is retained thereon by any suitable means such as, for example, the illustrated flanges 30A. In order to reduce light loss, preferably, mirror 33 is a front surface reflective mirror. Means for limiting the amount of angular rotation of the mirror assembly 21 about the hinge 31 is provided by a gas-spring assembly 34 having a tubular portion 34A and a shaft 34B telescopingly extending outwardly from one end of the tubular portion 34A. The outer end of the shaft 34B is pivotally connected by a pivot pin 35 to a bracket 36 mounted on the door 30. The outer end of the tubular portion 34A is similarly pivotally connected by a pivot pin 37 to a bracket 38 mounted on the interior surface of the bottom of the compartment 17.

The mirror assembly 21 is normally stowed in a closed position as generally indicated by the dashed line representation thereof. In this position it will be appreciated that the lowermost surface of the mirror assembly is substantially flush with the corresponding surface of the compartment 17 and, thus, presents an appearance which integrates well with that of the compartment 17. At such time as in-flight entertainment is to be shown, the mirror assembly 21 is relesed from its stowed position by releasing a latch (not shown), which permits the mirror assembly 21 to open on its own accord under the influence of gravity. One important feature of the construction of the mirror assembly 21 that should be noted is the arc described by the pivot pin 35 as the mirror assembly rotates downwardly about the axis of rotation of the hinge 31. More particularly, during the first few degrees of angular travel, nominally about 20 degrees, the pivot pin 35 moves axially towards the pivot pin 37, thereby moving the shaft 34B axially into tubular portion 34A. As a consequence of such movement, a reaction force is exerted by the gas-spring assembly 34 against the pivot pin 35 which prevents the mirror assembly 21 from opening too quickly when first unlatched. As the pivot pin 35 continues downwardly along its arc, it eventually reaches a point where it begins to move axially away from the pivot pin 37. From this position on the gas-spring assembly 34 exerts a pushing force against the mirror assembly 21 and rotates the mirror assembly downwardly until the shaft 34B reaches its maximum limit of outward extension from the tubular portion 34A. This limit of outward extension is selected to correspond to the distance necessary to rotate the mirror assembly 21 to a position whereat it intersects the light beam produced by a suitably positioned video projector and redirects it toward a projection screen as illustrated in FIG. 1 and previously described. Gas dampening forces in the gas-spring assembly 34 prevent the shaft 34B from extending so rapidly that downward rotating movement of the mirror assembly 21 poses a safety hazard to aircraft personnel and passengers.

Figure 3:
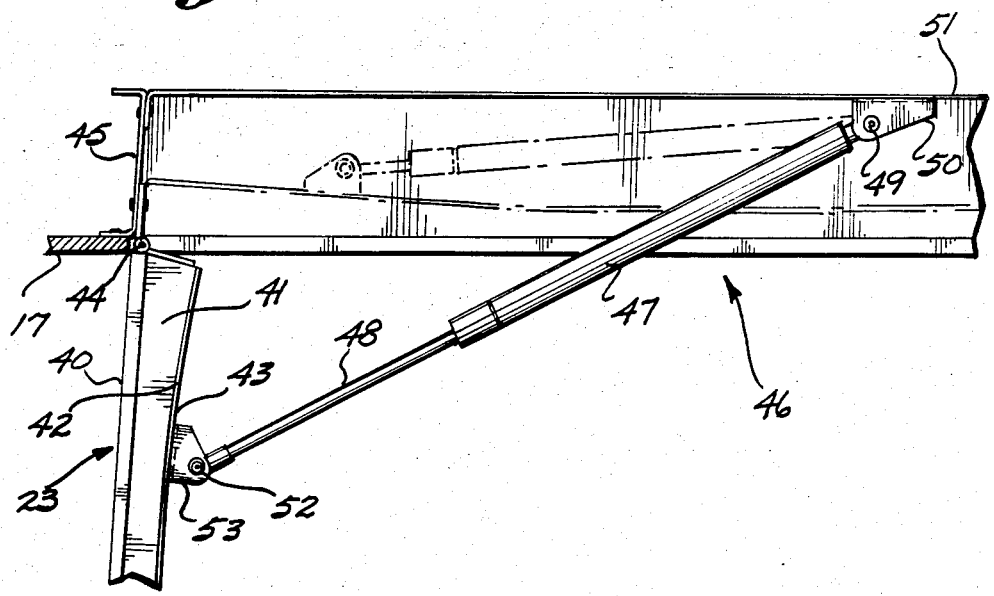
FIG. 3 is a partial, cut-away side view of the preferred form of the projection screen assembly 23 shown in FIG. 1.

Referring now to FIG. 3, the preferred embodiment of the present invention includes a projection screen assembly 23 that, as noted above, also forms an integral part of compartment 17 to thereby present the aircraft passengers with a neat and aesthetically pleasing appearance. The projection screen assembly 23 includes a substantially planar support of door 40, selected to match the exterior appearance of the compartment 17, a central support 41, preferably having a curved wall 42, and a projection screen 43 mounted on the curved wall 42. The projection screen is curved to enhance the intensity of the video images displayed thereon. The projection screen assembly 23 is rotatably attached to the compartment 17 by a hinge 44, which is secured to a ceiling support 45. Rotational movement of the projection screen assembly 23 between a stowed position, illustrated by dashed lines in FIG. 3, and a fully deployed position, whereat the projection screen 43 is visible to the aircraft cabin passengers, is controlled in substantially the same identical manner as the mirror assembly 21. More particularly, the control mechanism includes a gas-spring assembly 46 having a tubular portion 47 and a shaft 48 telescopingly extending outwardly from one end of the tubular portion 47. The outer or free end of the tubular portion 47 is pivotally secured to the interior of the compartment 17 by a pivot pin 49 attached to a bracket 50. The bracket is, in turn, attached to a support 51 located in the compartment. The free end of the shaft 48 is secured by a pivot pin 52 to a bracket 53, which is, in turn, secured by any suitable means to the projection screen assembly 23.

The projection screen assembly 23 is released from its stowed position by releasing a latch (not shown) that permits the projection screen assembly 23 to open on its own accord under the influence of gravity. During the first few degrees of angular travel, nominally about 10 degrees, the pivot pin 52 follows an arc that moves it axially towards the pivot pin 49. Thereafter the pivot pin 52 moves axially in the opposite direction until shaft 48 reaches its maximum limit of outward extension. This limit is selected to correspond to the distance necessary to rotate the projection screen assembly 23 to a position whereat the projection screen 43 intersects the light beam deflected by the mirror 33 and provides the aircraft passengers with a clear view of the video images transmitted by the video projector (FIG. 1).

It should be understood that gas-spring assemblies 34 and 46 are employed in pairs and that only one of each such pairs is illustrated in FIGS. 2 and 3 in order to simplify the figures and the discussion.

Figure 4:
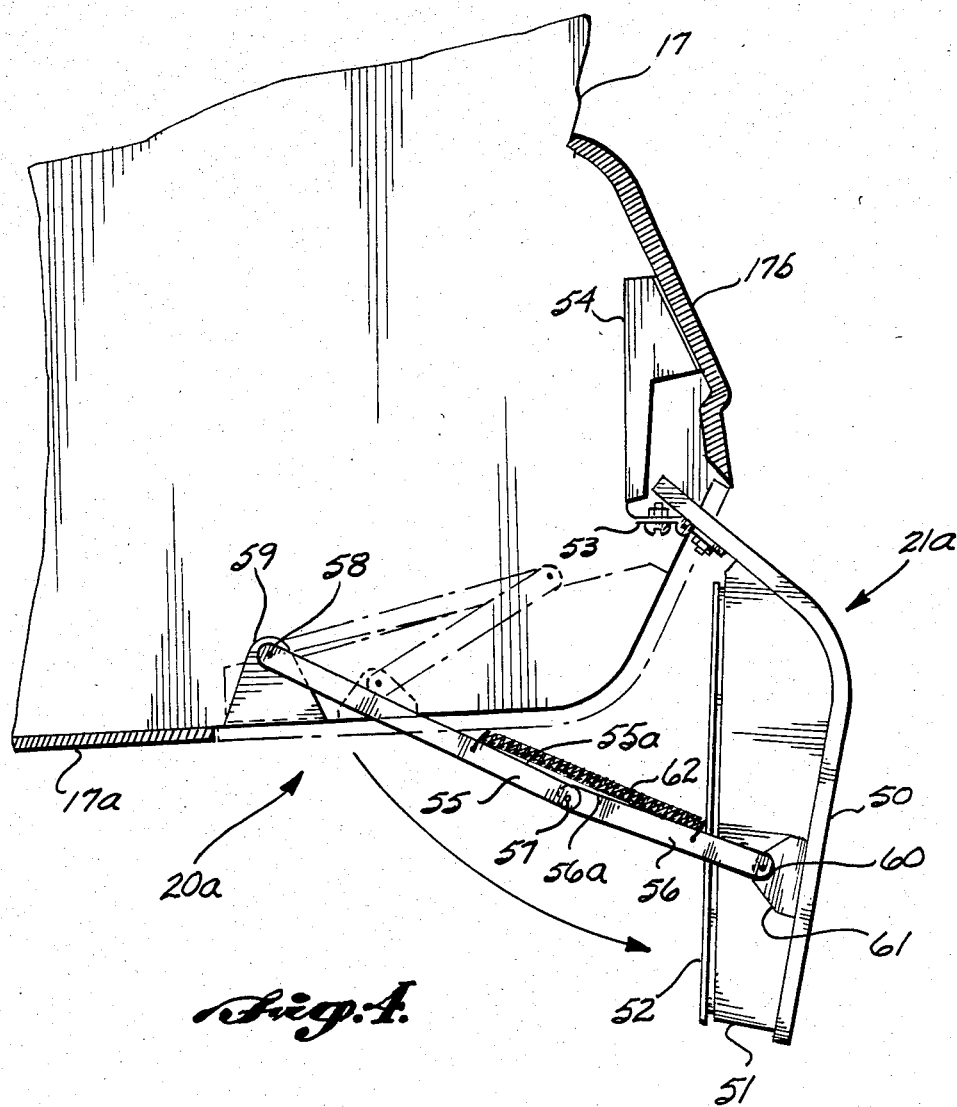
FIG. 4 is a partial, cut-away side view of an alternate form of a mirror assembly.

FIG. 4 illustrates an alternate embodiment of a mirror assembly 21A that is especially useful in situations where the underside dimensions of the compartment 17 are insufficient to house the mirror assembly 21 illustrated in FIG. 2. In this alternate form of the invention, the compartment 17 includes a generally horizontally portion 17A and a generally vertical portion 17B. An opening 20A is provided through the compartment 17 at the corner where the portions 17A and 17B are joined. The opening 20A is thus defined by generally horizontal and generally vertical intersecting planes. Mirror assembly 21A includes a support or door 50 that conforms in angular dimensions and shape to the opening 20A, and in external appearance to that of the compartment 17. A mirror support 51 is mounted on door 50, and a mirror 52 is in turn mounted on the mirror support 51. Mirror assembly 21A is rotatably attached to the compartment 17 by a hinge 53 connected to a support 54, which is in turn secured to the interior surface of the vertical portion 17B.

Mirror assembly 21A is normally stowed in a closed position, as generally indicated by the dashed line representation thereof. It is released from its stowed position by releasing a latch (not shown) that permits the mirror assembly 21A to open on its own accord under the influence of gravity.

Means for limiting rotational movement of the mirror assembly 21A is provided in the form of a pair of support arms 55 and 56, which are pivotally connectd in overlapping engagement by a pivot pin 57. The opposite end of the support arm 55 is pivotally connected by a pivot pin 58 to a bracket 59 mounted on the interior surface of the horizontal portion 17A of the compartment 17. The opposite end of the support arm 56 is pivotally connected by a pivot pin 60 to a bracket 61 mounted on the door 50.

The support arms 55 and 56 are preferably provided with cooperable abutment means engageable to prevent further rotating movement of the mirror assembly 21A once the mirror 52 has been moved into a position of light deflecting alignment relative to a video projector (not shown). Such abutment means may take the form of a flange 56A extending transversely outwardly from the support arm 56 and adapted for abutting enagement along one side thereof with the edge 55A of the support arm 55 whenever the support arms 55 and 56 are rotated to a position just slightly beyond the position where they are in longitudinal alignment. The rate of angular rotation of the mirror assembly 21A may be limited along at least a part of its range of angular travel by means such as a spring 62 attached at one end to the support arm 55 at a position intermediate the pivot pins 57 and 58, and at its opposite end to the support arm 56 at a position intermediate the pivot pins 57 and 60. The spring 62 additionally serves as a means for releasably locking the support arms 55 and 56 in abutting engagement.

Alternatively, the mirror assembly 21A shown in FIG. 4 can be employed with a gas-spring assembly of the type illustrated in FIG. 2 of the preferred embodiment.

In view of the foregoing it will be appreciated that disclosed herein is an aircraft video projection system that in large measure overcomes the drawbacks associated with the prior art. More particularly, the aircraft video projection system of this invention employs the unique and novel combination of a video projector, mirror and projection screen, resulting in a video projection system of unusually compact dimensions. Because of such compactness the system may be located sufficiently forward of the passenger seats in an aircraft cabin that the risks of head injury are substantially diminished. Additionally, the forward location of the system permits passengers to move more freely about the cabin while programs are being shown without interrupting the viewing enjoyment of the other passengers. By incorporating the system as an integral part of the ceiling structure, it is now possible to provide an aircraft video projecting system having an aesthetically pleasing appearance when stowed. Still further, by mounting the projection screen on a hinged, rigid support, it is also now possible to realize the increased efficiencies of a curved projection screen over a flat screen without being limited, as in the past, to having the screen mounted permanently on a vertical cabin bulkhead.

While alternate, particular embodiments of the present invention have been disclosed herein, it will be understood that various changes, rearrangements and modifications can be made thereto without departing from the essence and scope of the invention as defined in the appended claims. For example, while not depicted in FIG. 1, it will be readily appreciated that the aircraft video projection system could be positioned above the upper ceiling, with the mirror assembly and projection screen assembly substantially flush thereto when in the stowed position. Accordingly, it is intended that the present disclosure not be interpreted in a limiting sense and that obvious variants of the invention are comprehended to be within its essence and scope.

The embodiments of the invention in which an exclusive property or privilege is claimed are defined as follows:

1. A video projection system suitable for mounting above a ceiling of the passenger compartment of an aircraft for displaying video images for passengers embarked on the aircraft comprising:
   (a) a video projector positioned above said ceiling in said aircraft passenger compartment, said ceiling having an opening through which said video projector transmits video images along a predetermined first path;
   (b) light deflecting means supported in a position of light deflecting alignment relative to said first path, said position of light deflecting alignment being on the side of said ceiling opposite said video projector, said light deflecting means for deflecting said video images along a predetermined second path; and,
   (c) projection screen means supported in a position of light receiving alignment relative to said second path for receiving and displaying to said aircraft passengers the video images deflected along said second path, said first path being no longer than said second path and defining an acute angle with said ceiling.

2. A video projection system as set forth in claim 1:
   (a) wherein said light deflecting means includes a mirror and a mirror support member on which said mirror is mounted;
   (b) further including pivoting means attaching said mirror support member to said ceiling such that said mirror is movable between a stowed position, wherein said light deflecting means is substantially flush with said ceiling, and a deployed position, wherein said mirror is supported in said position of light deflecting alignment relative to said first path; and,
   (c) also including limiting means connected between said ceiling and said mirror support member for limiting the movement of said mirror to a pivotal range defined at its limits by said stowed and deployed positions and for limiting the rate at which said mirror moves within said pivotal range.

3. A video projection system as set forth in claim 2:
   (a) wherein said projection screen means includes a projection screen and a projection screen support member on which said projection screen is mounted;
   (b) further including pivoting means attaching said projection screen support member to said ceiling such that said projection screen is movable between a stowed position, wherein said projection screen means is substantially flush with said ceiling, and a deployed position, wherein said projection screen is supported in said position of light receiving alignment relative to said second path; and,
   (c) also including limiting means connected between said ceiling and said projection screen support member for limiting the movement of said projection screen to a pivotal range defined at its limits by said stowed and deployed positions and for limiting the rate at which said projection screen moves within said pivotal range.

4. A video projection system as set forth in claim 3, further comprising curved wall means on said projection screen support member for receiving said projection screen.

5. A video projection system as set forth in claim 1:
   (a) wherein said projection screen means includes a projection screen and a projection screen support member on which said projection screen is mounted;
   (b) further including pivoting means attaching said projection screen support member to said ceiling such that said projection screen is movable between a stowed position and a deployed position wherein said projection screen is supported in said position of light receiving alignment relative to said second path; and,
   (c) also including limiting means connected between said ceiling and said projection screen support member for limiting the movement of said projection screen to a pivotal range defined at its limits by said stowed and deployed positions and for limiting the rate at which said projection screen moves within said pivotal range.

6. A video projection system as set forth in claim 5, further including curved wall means on said projection screen support member for receiving said projection screen.

7. A video projection system suitable for mounting above a ceiling of the passenger compartment of an aircraft for displaying video images for passengers embarked on the aircraft comprising:
   (a) a video projector positioned above said ceiling in said aircraft passenger compartment, said ceiling having an opening through which said video projector transmits video images along a predetermined first path;
   (b) a mirror support member,
   (c) a mirror mounted on said mirror support member in a position of light deflecting alignment relative to said first path, said position of light deflecting alignment being on the side of said ceiling opposite said video projector, said mirror deflecting said video images along a predetermined second path;
   (d) pivoting means attaching said mirror support member to said ceiling for movement of said mirror between a stowed position, wherein said mirror support member is substantially flush with said ceiling, and a deployed position, wherein said mirror is supported in said position of light deflecting alignment relative to said first path;
   (e) a gas-spring assembly for limiting the movement of said mirror to a pivotal range defined at its limits by said stowed and deployed positions and for limiting the rate at which said mirror moves within said pivotal range, said gas-spring assembly having a first end pivotally secured to said ceiling and a second end pivotally secured to said mirror support member, said gas-spring assembly configured so that said pivotal range of said mirror movement between said stowed and deployed positions includes a first region through which said gas-spring assembly provides a first level of force restricting said mirror movement, and a second region through which said gas-spring assembly provides a second level of force restricting said mirror movement, said first and second levels of force producing separately desired pivot rates of said mirror in each of said first and second regions of said pivot range; and (f) projection screen means supported in a position of light receiving alignment relative to said second path for receiving and displaying to said aircraft passengers the video images deflected along said second path, said first path being no longer than said second path.

8. A video projection system suitable for mounting above a ceiling of the passenger compartment of an aircraft for displaying video images for passengers embarked on the aircraft comprising:

(a) a video projector positioned above said ceiling in said aircraft passenger compartment, said ceiling having an opening through which said video projector transmits video images along a predetermined first path;

(b) a mirror support member;

(c) a mirror mounted on said mirror support member in a position of light deflecting alignment relative to said first path, said position of light deflecting alignment being on the side of said ceiling opposite said video projector, said mirror deflecting said video images along a predetermined second path;

(d) pivoting means attaching said mirror support member to said ceiling for movements of said mirror between a stowed position, wherein said mirror support member is substantially flush with said ceiling, and a deployed position, wherein said mirror is supported in said position of light deflecting alignment relative to said first path;

(e) a pair of support arms for limiting the movement of said mirror to a pivotal range defined at its limits by said stowed and deployed positions and for limiting the rate at which said mirror moves within said pivotal range, each of said support arms having a first and second end, said first end of one of said support arms pivotally secured to said mirror support member and said first end of the other of said support arms pivotally secured to said ceiling, said second ends of said support arms pivotally secured to each other, said support arms defining an acute angle therebetween when said mirror is in said stowed position and an obtuse angle when said mirror is in said deployed position, one of said support arms including abutment means for limiting said support arms to said obtuse angle at said deployed position;

(f) resilient means having first and second ends attached to opposite ones of said support arms, said resilient means applying a force to said support arms resisting said mirror movement; and (g) projection screen means supported in a position of light receiving alignment relative to said second path for receiving and displaying to said aircraft passengers the video images deflected along said second path, said first path being no longer than said second path.

9. A video projection system suitable for mounting above a ceiling of the passenger compartment of an aircraft for displaying video images for passengers embarked on the aircraft comprising:

(a) a video projector positioned above said ceiling in said aircraft passenger compartment, said ceiling having an opening through which said video projector transmits video images along a predetermined first path;

(b) a mirror support member;

(c) a mirror mounted on said mirror support member in a position of light deflecting alignment relative to said first path, said position of light deflecting alignment being on the side of said ceiling opposite said video projector, said mirror deflecting said video images along a predetermined second path;

(d) pivoting means attaching said mirror support member to said ceiling for movement of said mirror between a stowed position, wherein said mirror support member is substantially flush with said ceiling, and a deployed position, wherein said mirror is supported in said position of light deflecting alignment relative to said first path;

(e) limiting means connected between said ceiling and said mirror support member for limiting the movement of said mirror to a pivotal range defined at its limits by said stowed and deployed positions and for limiting the rate at which said mirror moves within said pivotal range;

(f) a projection screen support member;

(g) a projection screen mounted on said projection screen support member in a position of light receiving alignment relative to said second path, for receiving and displaying to said aircraft passengers the video images deflected along said second path, said first path being no longer than said second path;

(h) pivoting means attaching said projection screen support member to said ceiling for movement of said projection screen between a stowed position, wherein said projection screen support member is substantially flush with said ceiling, and a deployed position, wherein said projection screen is supported in said position of light receiving alignment relative to said second path; and (i) a gas-spring assembly for limiting the movement of said projection screen to a pivotal range defined at its limits by said stowed and deployed positions and for limiting the rate at which said projection screen moves within said pivotal range, said gas-spring assembly having a first end pivotally secured to said ceiling and a second end pivotally secured to said projection screen support member, said gas-spring assembly configured so that said pivotal range of said projection screen movement between said stowed and deployed positions includes a first region through which said gas-spring assembly provides a first level of force restricting said projection screen movement, and a second region through which said gas-spring assembly provides a second level of force restricting said projection screen movement, said first and second levels of force producing separately desired pivot rates of said light deflecting means in each of said first and second regions of said pivot range.

10. A video projection system suitable for mounting above a ceiling of the passenger compartment of an aircraft for displaying video images for passengers embarked on the aircraft comprising:

(a) a video projector positioned above said ceiling in said aircraft passenger compartment, said ceiling having an opening through which said video projector transmits video images along a predetermined first path;

(b) a mirror support member;

(c) a mirror mounted on said mirror support member in a position of light deflecting alignment relative to said first path, said position of light deflecting alignment being on the side of said ceiling opposite said video projector, said mirror deflecting said video images along a predetermined second path;

(d) pivoting means attaching said mirror support member to said ceiling for movement of said mirror between a stowed position, wherein said mirror support member is substantially flush with said ceiling, and a deployed position, wherein said mirror is supported in said position of light deflecting alignment relative to said first path;

(e) limiting means connecting between said ceiling and said mirror support member for limiting the movement of said mirror to a pivotal range defined at its limits by said stowed and deployed positions and for limiting the rate at which said mirror moves within said pivotal range;

(f) a projection screen support member;

(g) a projection screen mounted on said projection screen support member in a position of light receiving alignment relative to said second path, for receiving and displaying to said aircraft passengers the video images deflected along said second path, said first path being no longer than said second path;

(h) pivoting means attaching said projection screen support member to said ceiling for movement of said projection screen between a stowed position, wherein said projection screen support member is substantially flush with said ceiling, and a deployed position, wherein said projection screen is supported in said position of light receiving alignment relative to said second path;

(i) a pair of support arms for limiting the movement of said projection screen to a pivotal range defined at its limits by said stowed and deployed positions and for limiting the rate at which said projection screen moves within said pivotal range, each of said support arms having a first and second end, said first end of one of said support arms pivotally secured to said projection screen support member and said first end of the other of said support arms pivotally secured to said ceiling, said second ends of said support arms pivotally secured to each other, said support arms defining an acute angle therebetween when said projection screen is in said stowed position and an obtuse angle when said projection screen is in said deployed position, one of said support arms including abutment means for limiting said support arms to said obtuse angle at said deployed position; and (j) resilient means having first and second ends attached to opposite ones of said support arms, said resilient means applying a force to said support arms resisting said projection screen movement.

* * * * *